United States Patent
Wainer et al.

(10) Patent No.: US 12,093,325 B2
(45) Date of Patent: Sep. 17, 2024

(54) SYSTEM AND METHOD FOR NETWORK PLANNING BASED ON PRECISE REGION CLASSIFICATION

(71) Applicant: Verizon Patent and Licensing Inc., Basking Ridge, NJ (US)

(72) Inventors: Joshua Hane Wainer, Martinsville, NJ (US); Mathew Sunil John, Lansdale, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 322 days.

(21) Appl. No.: 17/507,980

(22) Filed: Oct. 22, 2021

(65) Prior Publication Data
US 2023/0129078 A1    Apr. 27, 2023

(51) Int. Cl.
*G06F 16/906* (2019.01)

(52) U.S. Cl.
CPC ................... *G06F 16/906* (2019.01)

(58) Field of Classification Search
CPC ..... G06F 16/906; G06F 16/904; G06F 16/909
USPC ......................................................... 455/446
See application file for complete search history.

(56) References Cited

U.S. PATENT DOCUMENTS

| | | | | |
|---|---|---|---|---|
| 11,336,319 | B2* | 5/2022 | Badic | H04B 7/0814 |
| 2014/0309782 | A1* | 10/2014 | Sharpe | G01N 15/1425 |
| | | | | 700/266 |
| 2018/0302893 | A1* | 10/2018 | Kosseifi | H04W 16/32 |
| 2020/0028746 | A1* | 1/2020 | Zawadzki | H04L 43/0876 |
| 2022/0138260 | A1* | 5/2022 | Koval | G01C 21/3841 |
| | | | | 707/798 |
| 2023/0199511 | A1* | 6/2023 | Singh | H04W 16/18 |
| | | | | 370/230 |

OTHER PUBLICATIONS

A Techno-Economic Framework for Installing Broadband Networks in Rural and Remote Areas; Marcela Alves De Souza; Apr. 2021 (Year: 2021).*

Ewing, et al., "Relationship between urban sprawl and physical activity, obesity, and morbidity", Am J Health Promot., vol. 18, Issue 1, pp. 47-57, Sep. 1, 2003. Abstract Only.

\* cited by examiner

*Primary Examiner* — Hirdepal Singh

(57) ABSTRACT

One or more computing devices, systems, and/or methods are provided. In an example, a population density metric and a geographic feature density metric are generated for a region. A morphology classification is generated for the region based on the population density metric and the geographic feature density metric. A communication site is controlled based on the morphology classification.

20 Claims, 10 Drawing Sheets

|  | POPULATION COUNT | POI COUNT | GEOGRAPHIC FEATURE COUNT |
| --- | --- | --- | --- |
| ABOVE HIGH | DENSE URBAN ($>C1$) | ABOVE DOWNTOWN ($>C4$) |  |
| HIGH | URBAN ($>C2, <C1$) | DOWNTOWN ($>C5, <C4$) | COMPACT ($>C7$) |
| MEDIUM | SUBURBAN ($>C3, <C2$) | DEVELOPING ($>C6, <C5$) | NORMAL ($>C8, <C7$) |
| LOW | RURAL ($<C3$) | UNDERDEVELOPED ($<C6$) | SWOLLEN ($<C8$) |

Fig. 4A

|  | POPULATION COUNT | POI COUNT | GEOGRAPHIC FEATURE COUNT |
| --- | --- | --- | --- |
| ULTRA-DENSE | ABOVE HIGH | ABOVE HIGH | ANY |
| DENSE URBAN | ABOVE HIGH | HIGH | ANY |
| URBAN | HIGH | HIGH | HIGH |
| URBAN-SUBURBAN | HIGH | HIGH | MEDIUM |
|  | HIGH | MEDIUM | ANY |
|  | MEDIUM | MEDIUM | HIGH |
|  | MEDIUM | HIGH | ANY |
| SUBURBAN | MEDIUM | MEDIUM | MEDIUM |
| SUBURBAN-RURAL | ANY | MEDIUM | LOW |
|  | MEDIUM | LOW | ANY |
| RURAL | LOW | ANY | ANY |

Fig. 4B

SYSTEM AND METHOD FOR NETWORK PLANNING BASED ON PRECISE REGION CLASSIFICATION

BACKGROUND

Communication service providers provide service in many different regions with significantly varying characteristics, such as population and network utilization. Communications equipment is selected and installed in the different regions to balance quality of service versus cost. Morphology classifications are sometimes employed to designate population densities in regions served by a communication service provider. For example, a region may be designated as dense urban, urban, suburban, or rural based on the population.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4A is a diagram illustrating density classifications.

FIG. 4B is a diagram illustrating morphology classifications.

DETAILED DESCRIPTION OF EXAMPLE EMBODIMENTS

Figure 1:
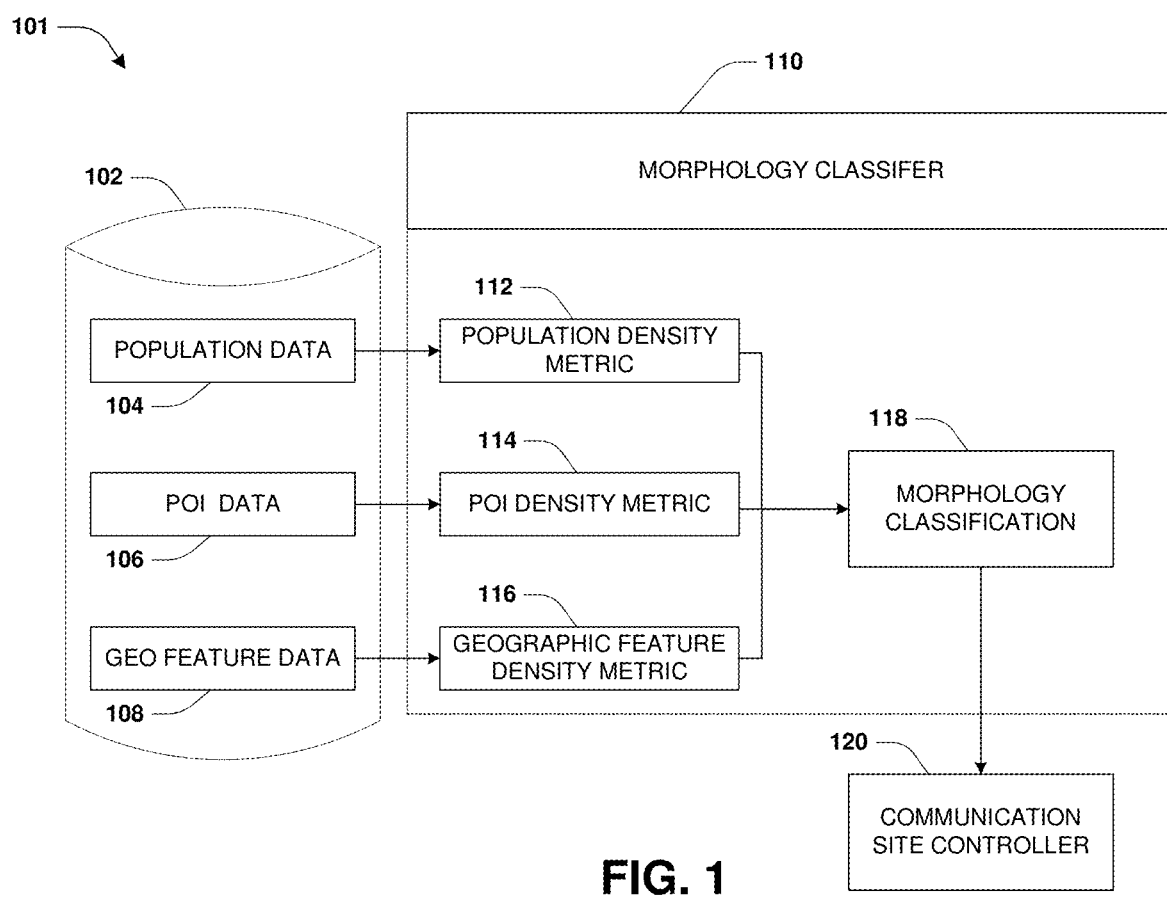
FIG. 1 is a diagram illustrating an example system for network planning based on precise region classification.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for network planning based on precise region classification. Communication service providers provide service in many different regions each having different network loading characteristics that vary based on the population within the region, the physical density of the region, and the usage types within the region (e.g., residential versus business). Communications equipment is selected and installed in the different regions to balance quality of service versus cost. A morphology classification is generated for a region and used to control communication sites within the region. A communication site may include a, base station, a 4g node, a 5g node, an LTE node, etc. Communication site capacity, coverage, and power requirements typically depend on the morphology classification. In general, when a region is planned out for network coverage and capacity based on a more accurate morphology classification assigned to it, fewer customers will have their speeds reduced and fewer customers will have dropped calls.

According to some embodiments, population density, point of interest (POI) density, and/or geographic feature density are employed to generate graded density classifications, such as above high, high, medium, and low, though more classifications are also contemplated herein. The graded density classifications are combined to generate a morphology classification for the region. For example, a region may be designated as ultra dense, dense urban, urban, urban-suburban, suburban, suburban-rural, or rural based on the graded density classifications, though more designations are also contemplated herein.

In some embodiments, morphology classification is employed to reduce or throttle the bandwidth allocated to users when a communication site has a higher Composite Utilization (CU), which is an objectively measured ratio of a cell sector's usage during the 3rd-busiest hour over the past month divided by its capacity. In this case, "usage" and "capacity" can refer to either the number of average scheduled eligible users, or the average number of active connections, depending on whichever usage-to-capacity ratio is higher. When CU passes a defined threshold assigned based on the morphology classification, the speeds for users are reduced. If a communication site is assigned an inaccurate morphology classification, customers will encounter lower or throttled speeds on their devices since the CU threshold of the communication site will be inaccurate. A more accurate morphology classification results in a fewer number of customers experiencing network issues, such as having their speeds unnecessarily reduced, unplanned outages, and the like.

In some embodiments, the morphology classification is used to determine how many potential new communication sites should be placed in a region with growing urban sprawl (more customers and houses in a given region). An inaccurate morphology classification results in too few new communication sites being installed in the growing region. If not enough new communication sites are placed in the growing region, the existing communication sites in the region will have to handle increased traffic and risk being exhausted of RF spectrum for the customers. These sites will have higher CUs, and customers connected to these sites will have lower speeds.

In some embodiments, the morphology classification is used for energy savings. Communication sites need sufficient power to propagate signals out to the cell boundaries and to cool or heat equipment according to the environment. Energy usage profiles of different communication sites may be modeled using the morphology classifications, based on when the sites need to be powered the most/least. An inaccurate morphology classification can result in a communication site having an incorrect power model. If a communication site is given less power than it needs, its signal strength to distant customers is reduced, and the communication site might freeze or overheat in extreme conditions. If customers cannot get a good signal, they may experience more dropped calls and lower speeds. Also, if communication sites freeze or overheat, they will not be able to handle as high of a CU as they normally would, leading to customers having degraded service.

Figure 2:
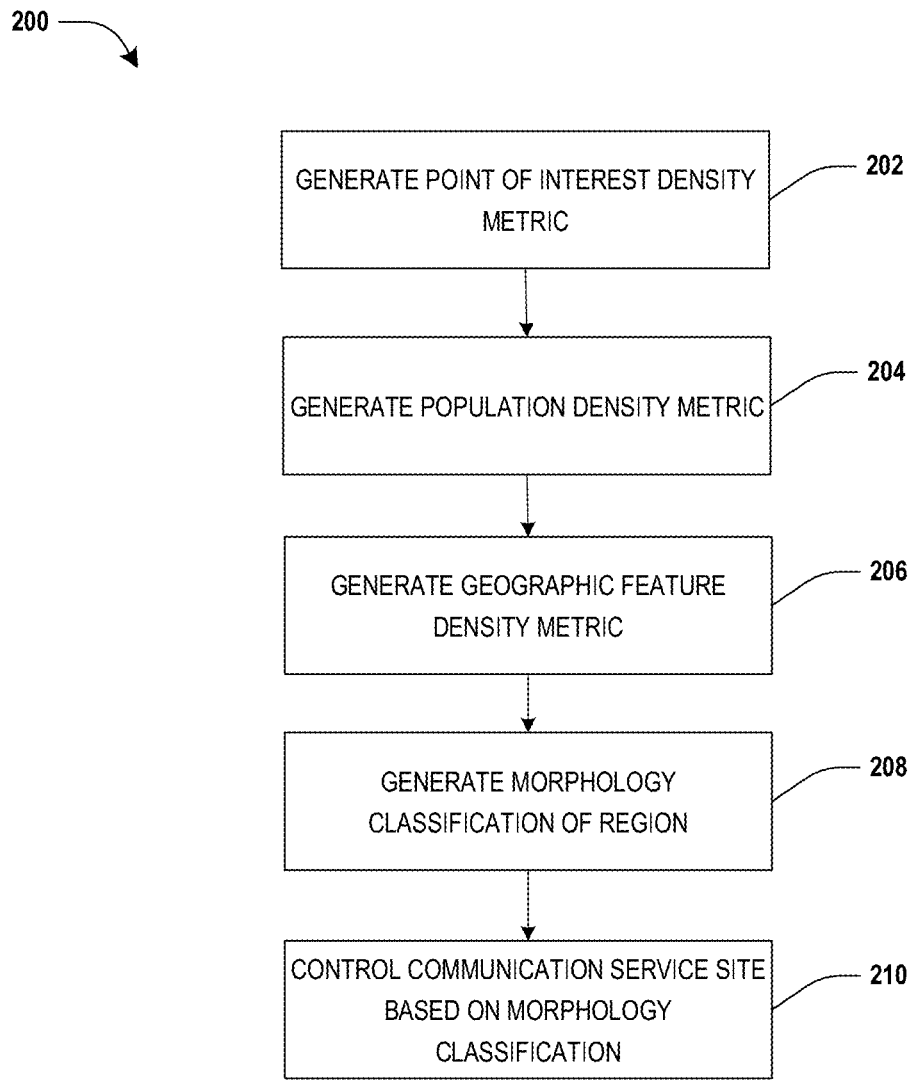
FIG. 2 is a flow chart illustrating an example method for network planning based on precise region classification.

FIG. 1 is a diagram illustrating an example system 101 for network planning based on precise region classification. FIG. 2 is a flow chart illustrating an example method 200 for network planning based on precise region classification. In some embodiments, the example method 200 is implemented by the example system 101.

Referring to FIG. 1, a database 102 stores density information for different regions of an area. In some embodiments, the density information includes population data 104, point of interest (POI) data 106, and geographic feature data 108. A morphology classifier 110 uses the population data 104, the POI data 106 and the geographic feature data 108 to generate density metrics for each region, such as a population density metric 112, a POI density metric 114, and a geographic feature density metric 116. The morphology classifier 110 generates a morphology classification 118 for the region based on the population density metric 112, the POI density metric 114, and the geographic feature density metric 116. A communication site controller 120 uses the morphology classification 118 to control a communication site in the region.

In some embodiments, the regions analyzed by the morphology classifier 110 correspond to census tracts defined by the United States Census Bureau. A census tract is a statistical subdivision or a count that have approximately 4000 inhabitants. A census block group is a subdivision of a census tract and contains a cluster of census blocks. A census block group typically includes between 250 and 550 housing units. A census block is the smallest geographic census unit. A census block can be bounded by physical boundaries, such as roads, streams, and railroad tracks, or by logical boundaries, such as political boundaries, property lines, city limits, township limits, school district limits, or county limits. In some cases, census blocks correspond to city blocks. The physical boundaries and logical boundaries generally represent geographic features, so census blocks may be referred to as geographic feature blocks. In some embodiments, boundaries other than United States census boundaries are used to define regions and geographic feature blocks. For example, in areas outside the United States, the regions may be subdivided differently.

Referring to FIG. 2, during operation 202 the morphology classifier 110 generates the population density metric 112. In some embodiments, the morphology classifier 110 generates the population density metric 112 based on a population living in the region and a population within a predetermined distance from the region (e.g., census tract). For example, the predetermined distance may comprise 5 miles from a center point of the region. In some embodiments, the morphology classifier 110 assigns a graded density classification to the total population within the predetermined distance to generate the population density metric 112.

Figure 3:
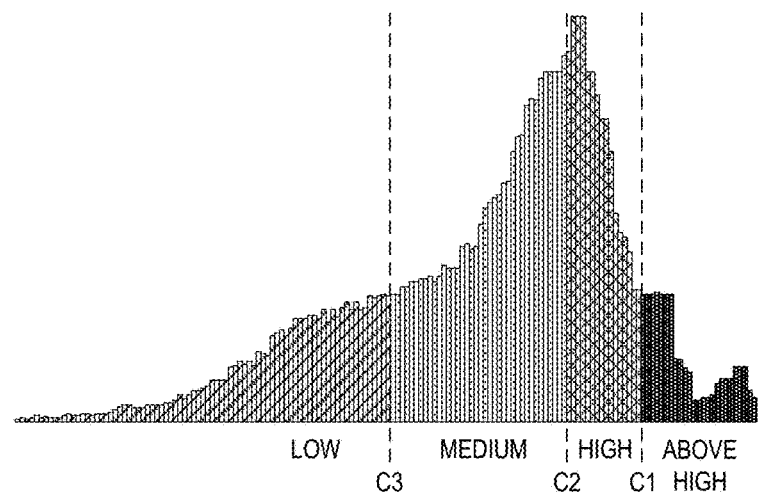
FIG. 3 is a diagram illustrating density index distributions.
Figure 3:
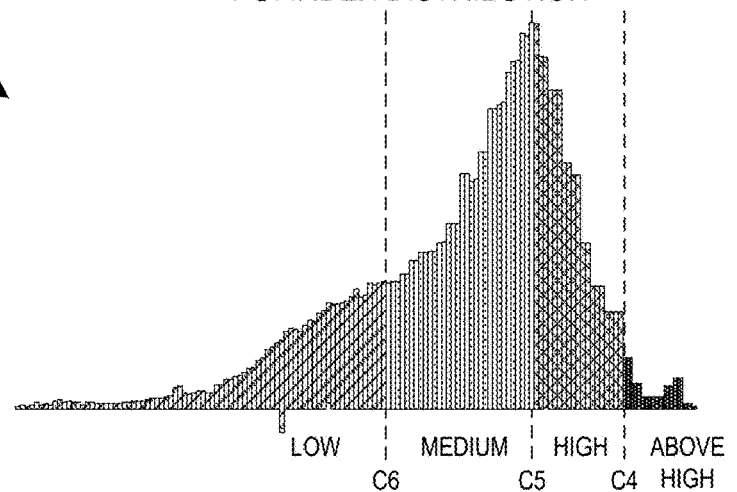
Figure 3:
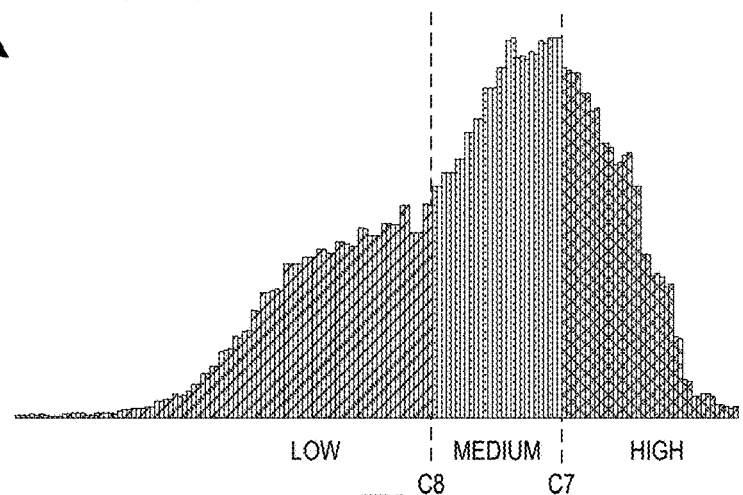

FIG. 3 is a diagram illustrating density index distributions, including a population distribution 302, a POI distribution 304, and a geographic feature distribution 306. In some embodiments, the density index distributions are generated based on the natural log of the counts for all of the regions. The density index distributions are manually subdivided to generate graded density classifications based on geographical observations in the data and/or analytical insight. For example, for the population distribution 302, an "ABOVE HIGH" graded density classification is assigned to total populations greater than C1, a "HIGH" graded density classification is assigned to total populations between C2 and C1, a "MEDIUM" graded density classification is assigned to total populations between C3 and C2, and a "LOW" graded density classification is assigned to total populations less than C3. The boundaries selected for the graded density classifications may vary. In some embodiments, the boundaries for the graded density classifications are selected based on statistical parameters of the distributions 302, 304, 306, such as standard deviations, or areas beneath the distributions 302, 304, 306. In some embodiments, the boundaries for the graded density classifications are determined empirically.

During operation 204 the morphology classifier 110 generates the POI density metric 114. A POI is generally considered a non-residential entity, such as a business, a government office, a park, or some other suitable entity. In some embodiments, the morphology classifier 110 generates the POI density metric 114 based on a count of POIs within the region and a count of POIs within a predetermined distance from the region (e.g., census tract). For example, the predetermined distance may comprise 5 miles from a center point of the region, which is the median of all the distances between a region's central point and the farthest point of its border. In some embodiments, the morphology classifier 110 assigns a graded density classification to the total POI count within the predetermined distance to generate the POI density metric 114. In other embodiments, the metric 114 may be calculated in alternative ways, such as the count of POIs within all regions immediately bordering the current region.

For the POI distribution 304 in FIG. 3, an "ABOVE HIGH" graded density classification is assigned to total POI counts greater than C4, a "HIGH" graded density classification is assigned to total POI counts between C5 and C4, a "MEDIUM" graded density classification is assigned to total POI counts between C6 and C5, and a "LOW" graded density classification is assigned to total POI counts less than C6.

During operation 206 the morphology classifier 110 generates the geographic feature density metric 116. In some embodiments, the morphology classifier 110 generates the geographic feature density metric 116 based on a count of geographic feature blocks in the region and a count of geographic feature blocks within a predetermined distance from the region (e.g., census tract). For example, the predetermined distance may comprises 5 miles from a center point of the region. In some embodiments, the geographic feature blocks correspond to census blocks. In some embodiments, the morphology classifier 110 assigns a graded density classification to the total geographic feature block count within the predetermined distance to generate the geographic feature density metric 116.

For the geographic feature distribution 306 in FIG. 3, a "HIGH" graded density classification is assigned to total geographic feature block counts greater than C7, a "MEDIUM" graded density classification is assigned to total geographic feature block counts between C8 and C7, and a "LOW" graded density classification is assigned to total geographic feature block counts less than C8.

In some embodiments, the predetermined distances for the determining the POI density metric 112, the population density metric 114, and the geographic feature density metric 116 may differ from each other.

FIG. 4A is a diagram illustrates the graded density classifications discussed in reference to FIG. 3 in tabular form. In some embodiments, the particular values of the count thresholds used to define the graded density classifications may vary.

During operation 208, the morphology classifier 110 generates the morphology classification 118 of a region based on the population density metric 112, the POI density metric 114, and the geographic feature density metric 116.

FIG. 4B is a diagram illustrating morphology classifications. Based on the graded density classifications defined by the population density metric 112, the POI density metric 114, and the geographic feature density metric 116 (e.g., ABOVE HIGH, HIGH, MEDIUM, LOW) the morphology classifier 110 generates the morphology classification 118 for the region. As illustrated in FIG. 4B, the morphology classification comprises one from an ordered set of "ULTRA DENSE," "DENSE URBAN," "URBAN," "URBAN-SUB-URBAN," "SUBURBAN," "SUBURBAN-RURAL," or "RURAL", with the ordering of such classifications being important. These morphology classifications are defined by combinations of graded density classifications in order to show two things. First, the morphology classifications show gradual changes in contiguous morphologies across contiguous geographies. For example, a "dense urban" morphology will not be found sharing a tract border with a "rural" one, since the "dense urban" category is only contiguous with "ultra dense" and "urban" categories, according to some embodiments. Second, the morphology classifications demonstrate that combining measurements derived from geographic data such as population density and census block size into a single index yields a spectrum of urbanization from dense, compact areas like New York City (which is mostly classified as ULTRA-DENSE) to more sprawling, sparsely populated regions on the outskirts of metropolitan areas, which are classified as SUBURBAN, SUBURBAN-RURAL, and RURAL.

Figure 4C:
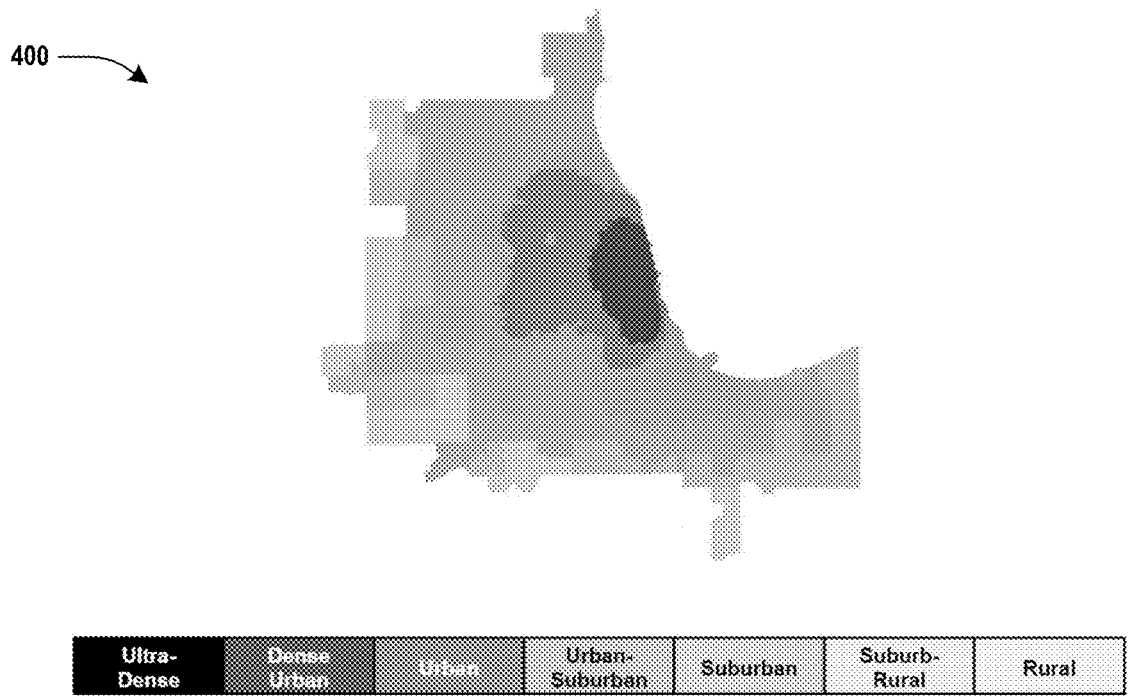
FIG. 4C is a diagram illustrating morphology classifications for an area in map form.

FIG. 4C is a diagram illustrating morphology classifications for regions in an area using a map 400. The morphology classifier 110 repeats the morphology classification defined by operations 202, 204, 206, 208 for all of the regions defined in an area. The map 400 shows the metropolitan area of Chicago, Illinois. The use of the population density metric 112, the POI density metric 114, and the geographic feature density metric 116 improves the granularity at which the morphology classifications are applied. For example if only population within 5 miles of a region (e.g., census tract) was considered in assigning the morphology classification, most of the regions in the area would be classified as dense urban. However, with the improved granularity provided by the POI density metric 114 and/or the geographic feature density metric 116, the accuracy of the morphology classifications for the regions is improved. In some embodiments, other the number of graded density classifications used to generate the morphology classification 118 varies. For example, the morphology classification 118 configurations may be generated based on the population density metric 112 and the POI density metric 114 or based on the population density metric 112 and the geographic feature density metric 116.

The morphology classification 118 assigned to a region allows management of the resources of the communication service provider in the region and neighboring regions. Referring to FIGS. 1 and 2, during operation 210, the communication site controller 120 controls a communication site within the region having the morphology classification 118.

Figure 5:
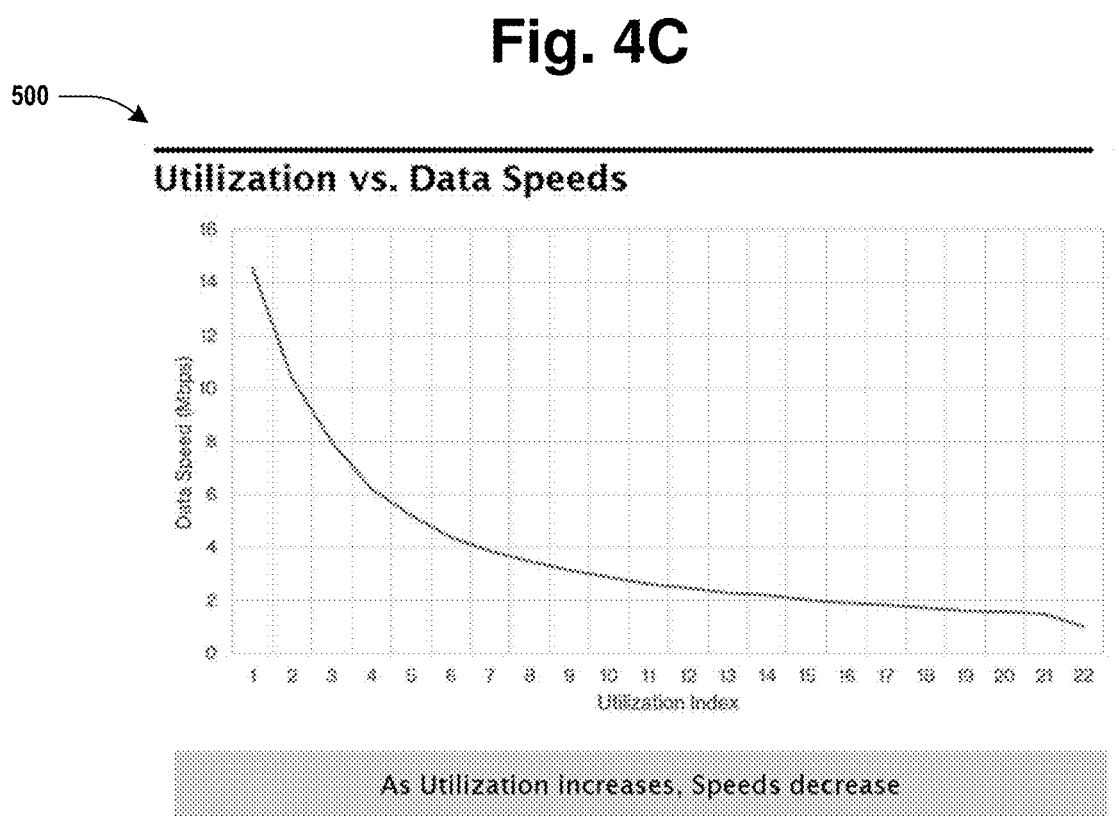
FIG. 5 is a diagram illustrating bandwidth as a function of utilization for a communication site.

FIG. 5 is a diagram of a graph 500 illustrating bandwidth as a function of utilization for a communication site. In some embodiments, the communication site controller 120 uses the morphology classification of a region to assign a utilization threshold for a utilization metric, such as a CI of communication sites within the region. In some embodiments, the communication site controller 120 reduces or throttles the bandwidth allocated to users when a communication site has a higher CU. When CU passes the CU threshold assigned by the communication site controller 120, the communication site controller 120 reduces speeds. If a communication site is assigned an inaccurate morphology classification, customers will experience lower or throttled speeds on their devices, since the CU threshold of the communication site will be inaccurate. Therefore, using the more accurate morphology classification 118 described herein, fewer customers will have their speeds unnecessarily reduced.

In some embodiments, the morphology classification 118 is used to determine how many potential new communication sites should be placed in a region with growing urban sprawl (more customers and houses in a given region). An inaccurate morphology classification can result in too few new communication sites being installed in the growing region. If not enough new communication sites are placed in the growing region, the existing communication sites in the region will have to handle increased traffic and risk being exhausted of RF spectrum for the customers. These sites will have higher CUs, and customers connected to these sites will have lower speeds.

In some embodiments, the morphology classification 18 is used for energy savings. Communication sites need sufficient power to propagate signals out to the cell boundaries and to cool or heat equipment according to the environment. The morphology classifications 118 are used to model the energy usage profiles of different communication sites based on when they need to be powered the most/least. An inaccurate morphology classification can result in a communication site having an incorrect power model. If a communication site is given less power than it needs, its signal strength to distant customers is reduced, and the communication site might freeze or overheat in extreme conditions. If customers cannot get a good signal, they may experience more dropped calls and lower speeds. Also, if communication sites freeze or overheat, they will not be able to handle as high of a CU as they normally would, leading to customers having degraded service.

According to some embodiments, a method is provided. The method includes generating a population density metric for a region; generating a geographic feature density metric for the region; generating a morphology classification for the region based on the population density metric and the geographic feature density metric; and controlling a communication site based on the morphology classification.

According to some embodiments, the method includes generating a point of interest (POI) density metric for the region, wherein generating the morphology classification for the region includes generating the morphology classification for the region based on the population density metric, the geographic feature density metric, and the POI density metric.

According to some embodiments, generating the POI density metric for the region includes generating the geographic feature density metric based on a first count of POI sites in the region and a second count of POI sites within a predetermined distance of the region.

According to some embodiments, the region is subdivided into geographic feature blocks; and generating the geographic feature density metric for the region includes generating the geographic feature density metric based on a first count of geographic feature blocks in the region and a second count of geographic feature blocks within a predetermined distance of the region.

According to some embodiments, the geographic feature blocks are bounded by at least one of one or more logical boundaries or one or more physical boundaries.

According to some embodiments, the region includes a census tract; and the geographic feature blocks include census blocks within the census tract.

According to some embodiments, generating the population density metric includes generating the population density metric based on a population of the region and a population within a predetermined distance of the region.

According to some embodiments, the population density metric includes a first graded density classification; the geographic feature density metric includes a second graded density classification; and generating the morphology classification for the region includes: combining the first graded density classification and the second graded density classification to generate the morphology classification.

According to some embodiments, the morphology classification includes at least one of ultra dense, dense urban, urban, urban-suburban, suburban, suburban-rural, or rural.

According to some embodiments, controlling the communication site based on the morphology classification includes assigning a utilization threshold to the communication site; determining a utilization metric for the communication site; and controlling data flow for users of the communication site based on the utilization threshold and the utilization metric.

According to some embodiments, a system is provided. The system includes a memory including instructions; and a processor coupled to the memory, the processor configured to execute the instructions to facilitate performance of operations. The operations include generating a population density metric for a region based on a population within a first predetermined distance of the region; generating a geographic feature density metric for the region based on a count of geographic feature blocks within a second predetermined distance of the region; generating a point of interest (POI) density metric for the region based on a count of POI sites within a third predetermined distance of the region; generating a morphology classification for the region based on the population density metric, the geographic feature density metric, and the POI density metric; and controlling a communication site based on the morphology classification.

According to some embodiments, the region is subdivided into geographic feature blocks; and generating the geographic feature density metric for the region includes generating the geographic feature density metric based on a first count of geographic feature blocks in the region and a second count of geographic feature blocks within the second predetermined distance of the region.

According to some embodiments, the geographic feature blocks are bounded by at least one of roads, streams, railroad tracks, property lines, or political boundaries.

According to some embodiments, the region includes a census tract; and the geographic feature blocks include census blocks within the census tract.

According to some embodiments, the population density metric includes a first graded density classification; the geographic feature density metric includes a second graded density classification; the POI density metric includes a third graded density classification; and generating the morphology classification for the region includes combining the first graded density classification, the second graded density classification, and the third graded density classification to generate the morphology classification.

According to some embodiments, the morphology classification includes at least one of ultra dense, dense urban, urban, urban-suburban, suburban, suburban-rural, or rural.

According to some embodiments, controlling the communication site based on the morphology classification includes assigning a utilization threshold to the communication site; determining a utilization metric for the communication site; and controlling data flow for users of the communication site based on the utilization threshold and the utilization metric.

According to some embodiments, a non-transitory computer-readable medium storing instructions that when executed facilitate performance of operations is provided. The operations include generating a population density metric for a region; generating a geographic feature density metric for the region; generating a point of interest (POI) density metric for the region; generating a morphology classification for the region based on the population density metric, the geographic feature density metric, and the POI density metric; and controlling a communication site based on the morphology classification.

According to some embodiments, generating the morphology classification for the region includes generating a first graded density classification based on the population density metric; generating a second graded density classification based on the geographic feature density metric; generating a third graded density classification based on the POI density metric; and combining the first graded density classification, the second graded density classification, and the third graded density classification to generate the morphology classification.

According to some embodiments, controlling the communication site based on the morphology classification includes assigning a utilization threshold to the communication site; determining a utilization metric for the communication site; and controlling data flow for users of the communication site based on the utilization threshold and the utilization metric.

Figure 6:
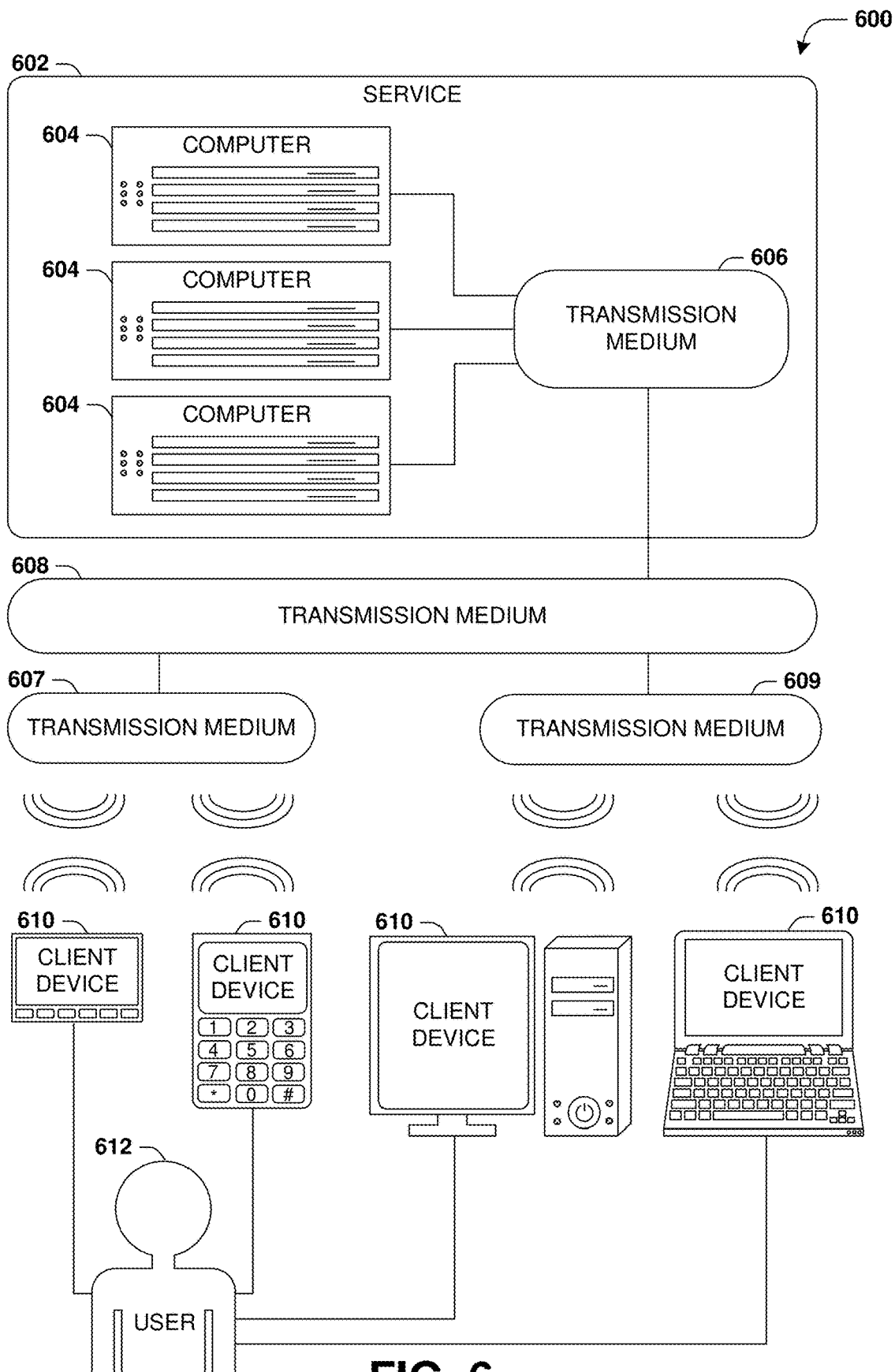
FIG. 6 is an illustration of a scenario involving various examples of transmission mediums that may be used to communicatively couple computers and clients.

FIG. 6 is an interaction diagram of a scenario 600 illustrating a service 602 provided by a set of computers 604 to a set of client devices 610 via various types of transmission mediums. The computers 604 and/or client devices 610 may be capable of transmitting, receiving, processing, and/or storing many types of signals, such as in memory as physical memory states.

The computers 604 of the service 602 may be communicatively coupled together, such as for exchange of communications using a transmission medium 606. The transmission medium 606 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 602.

Likewise, the transmission medium 606 may comprise one or more sub-networks, such as may employ different architectures, may be compliant or compatible with differing protocols and/or may interoperate within the transmission medium 606. Additionally, various types of transmission medium 606 may be interconnected (e.g., a router may provide a link between otherwise separate and independent transmission medium 606).

In scenario 600 of FIG. 6, the transmission medium 606 of the service 602 is connected to a transmission medium 608 that allows the service 602 to exchange data with other services 602 and/or client devices 610. The transmission medium 608 may encompass various combinations of devices with varying levels of distribution and exposure, such as a public wide-area network and/or a private network (e.g., a virtual private network (VPN) of a distributed enterprise).

In the scenario 600 of FIG. 6, the service 602 may be accessed via the transmission medium 608 by a user 612 of one or more client devices 610, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 610 may communicate with the service 602 via various communicative couplings to the transmission medium 608. As a first such example, one or more client devices 610 may comprise a cellular communicator and may communicate with the service 602 by connecting to the transmission medium 608 via a transmission medium 607 provided by a cellular provider. As a second such example, one or more client devices 610 may communicate with the service 602 by connecting to the transmission medium 608 via a transmission medium 609 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 604 and the client devices 610 may communicate over various types of transmission mediums.

Figure 7:
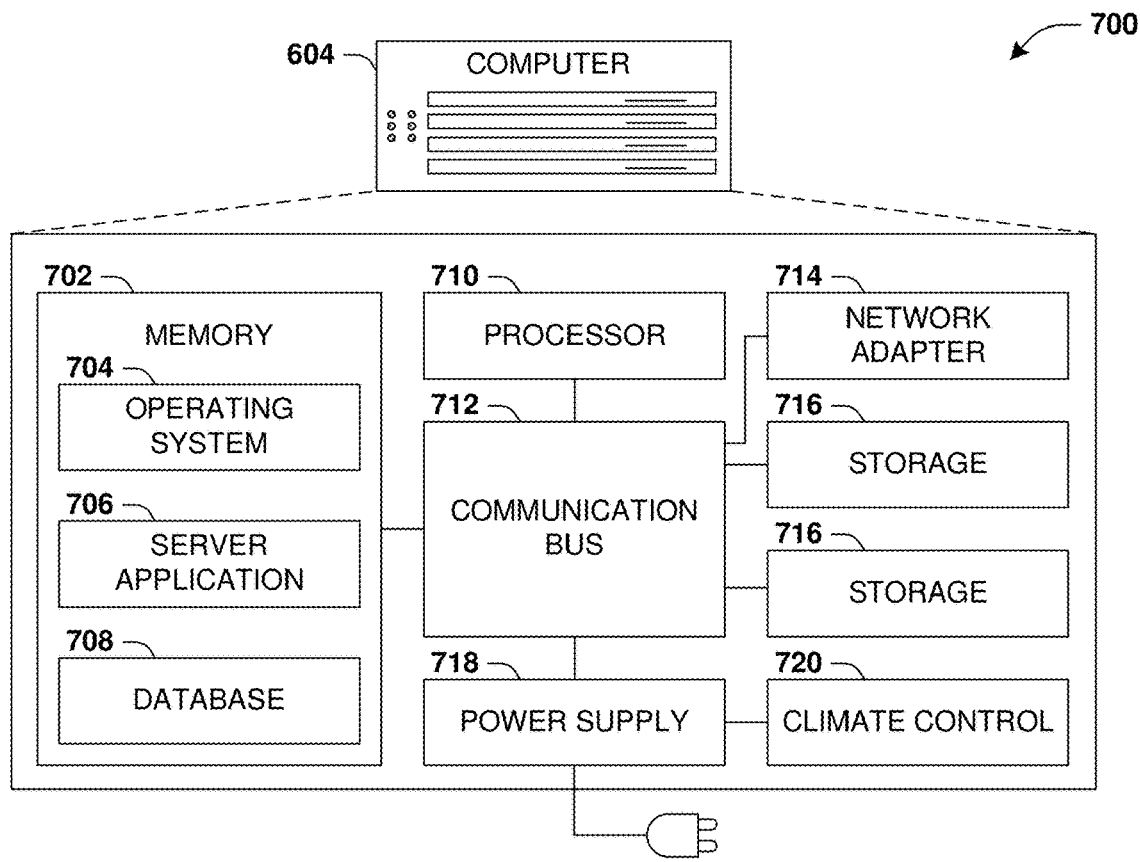
FIG. 7 is an illustration of a scenario involving an example configuration of a computer that may utilize and/or implement at least a portion of the techniques presented herein.

FIG. 7 presents a schematic architecture diagram 700 of a computer 604 that may utilize at least a portion of the techniques provided herein. Such a computer 604 may vary widely in configuration or capabilities, alone or in conjunction with other computers, in order to provide a service such as the service 602.

The computer 604 may comprise one or more processors 710 that process instructions. The one or more processors 710 may optionally include a plurality of cores; one or more coprocessors, such as a mathematics coprocessor or an integrated graphical processing unit (GPU); and/or one or more layers of local cache memory. The computer 604 may comprise memory 702 storing various forms of applications, such as an operating system 704; one or more computer applications 706; and/or various forms of data, such as a database 708 or a file system. The computer 604 may comprise a variety of peripheral components, such as a wired and/or wireless network adapter 714 connectible to a local area network and/or wide area network; one or more storage components 716, such as a hard disk drive, a solid-state storage device (SSD), a flash memory device, and/or a magnetic and/or optical disk reader.

The computer 604 may comprise a mainboard featuring one or more communication buses 712 that interconnect the processor 710, the memory 702, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 712 may interconnect the computer 604 with at least one other computer. Other components that may optionally be included with the computer 604 (though not shown in the schematic architecture diagram 700 of FIG. 7) include a display; a display adapter, such as a graphical processing unit (GPU); input peripherals, such as a keyboard and/or mouse; and a flash memory device that may store a basic input/output system (BIOS) routine that facilitates booting the computer 604 to a state of readiness.

The computer 604 may operate in various physical enclosures, such as a desktop or tower, and/or may be integrated with a display as an "all-in-one" device. The computer 604 may be mounted horizontally and/or in a cabinet or rack, and/or may simply comprise an interconnected set of components. The computer 604 may comprise a dedicated and/or shared power supply 718 that supplies and/or regulates power for the other components. The computer 604 may provide power to and/or receive power from another computer and/or other devices. The computer 604 may comprise a shared and/or dedicated climate control unit 720 that regulates climate properties, such as temperature, humidity, and/or airflow. Many such computers 604 may be configured and/or adapted to utilize at least a portion of the techniques presented herein.

Figure 8:
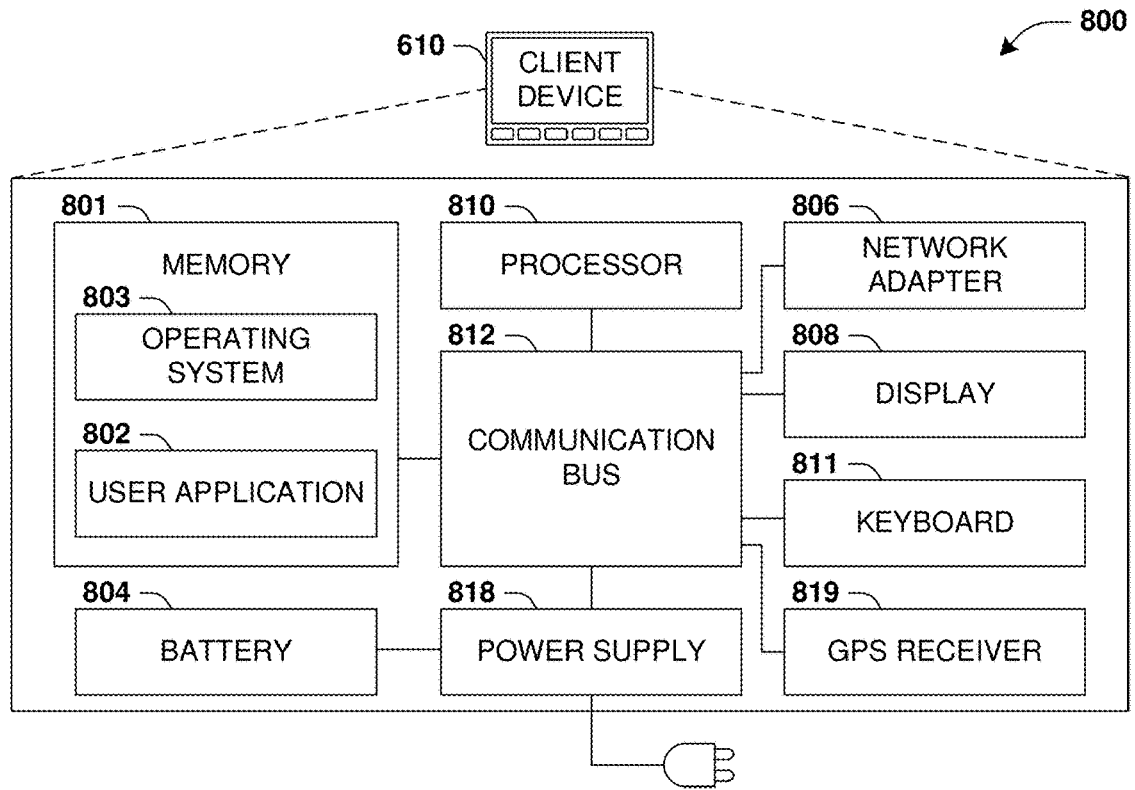
FIG. 8 is an illustration of a scenario involving an example configuration of a client that may utilize and/or implement at least a portion of the techniques presented herein.

FIG. 8 presents a schematic architecture diagram 800 of a client device 610 whereupon at least a portion of the techniques presented herein may be implemented. Such a client device 610 may vary widely in configuration or capabilities, in order to provide a variety of functionality to a user such as the user 612. The client device 610 may be provided in a variety of form factors, such as a desktop or tower workstation; an "all-in-one" device integrated with a display 808; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 610 may serve the user in a variety of roles, such as a workstation, kiosk, media player, gaming device, and/or appliance.

The client device 610 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The client device 610 may comprise memory 801 storing various forms of applications, such as an operating system 803; one or more user applications 802, such as document applications, media applications, file and/or data access applications, communication applications such as web browsers and/or email clients, utilities, and/or games; and/or drivers for various peripherals. The client device 610 may comprise a variety of peripheral components, such as a wired and/or wireless network adapter 806 connectible to a local area network and/or wide area network; one or more output components, such as a display 808 coupled with a display adapter (optionally including a graphical processing unit (GPU)), a sound adapter coupled with a speaker, and/or a printer; input devices for receiving input from the user, such as a keyboard 811, a mouse, a microphone, a camera, and/or a touch-sensitive component of the display 808; and/or environmental sensors, such as a global positioning system (GPS) receiver 819 that detects the location, velocity, and/or acceleration of the client device 610, a compass, accelerometer, and/or gyroscope that detects a physical orientation of the client device 610. Other components that may optionally be included with the client device 610 (though not shown in the schematic architecture diagram 800 of FIG. 8) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 610 to a state of readiness; and a climate control unit that regulates climate properties, such as temperature, humidity, and airflow.

The client device 610 may comprise a mainboard featuring one or more communication buses 812 that interconnect the processor 810, the memory 801, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 610 may comprise a dedicated and/or shared power supply 818 that supplies and/or regulates power for other components, and/or a battery 804 that stores power for use while the client device 610 is not connected to a power source via the power supply 818. The client device 610 may provide power to and/or receive power from other client devices.

Figure 9:
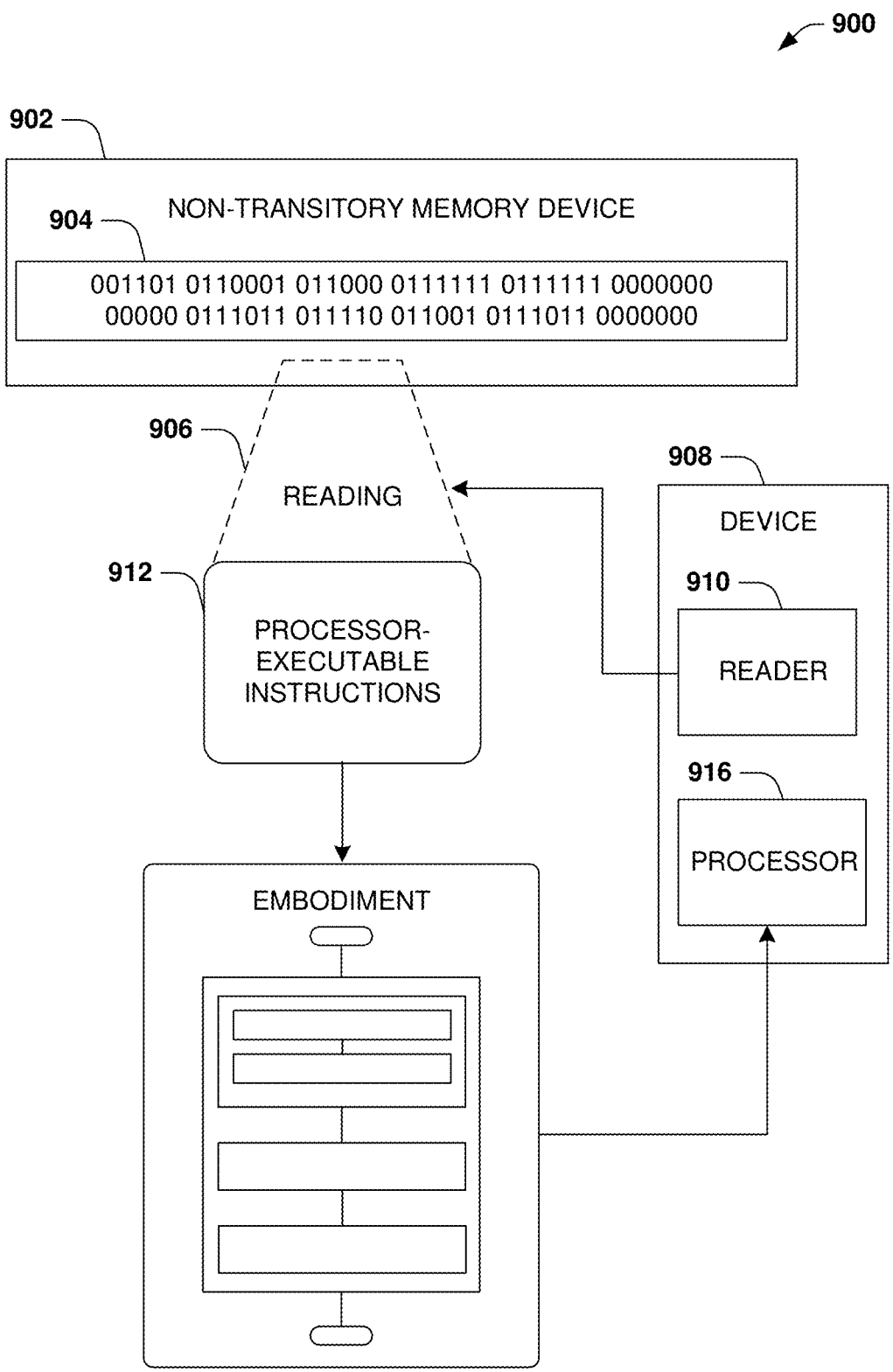
FIG. 9 is an illustration of a scenario featuring an example non-transitory machine readable medium in accordance with one or more of the provisions set forth herein.

FIG. 9 is an illustration of a scenario 900 involving an example non-transitory machine readable medium 902. The non-transitory machine readable medium 902 may comprise processor-executable instructions 912 that when executed by a processor 916 cause performance (e.g., by the processor 916) of at least some of the provisions herein. The non-transitory machine readable medium 902 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 902 stores computer-readable data 904 that, when subjected to reading 906 by a reader 910 of a device 908 (e.g., a read head of a hard disk drive, or a read operation invoked on a solid-state storage device), express the processor-executable instructions 912. In some embodiments, the processor-executable instructions 912, when executed cause performance of operations, such as at least some of the example method 200 of FIG. 2, for example. In some embodiments, the processor-executable instructions 912 are configured to cause implementation of a system, such as at least some of the example system 101 of FIG. 1, for example.

Figure 10:
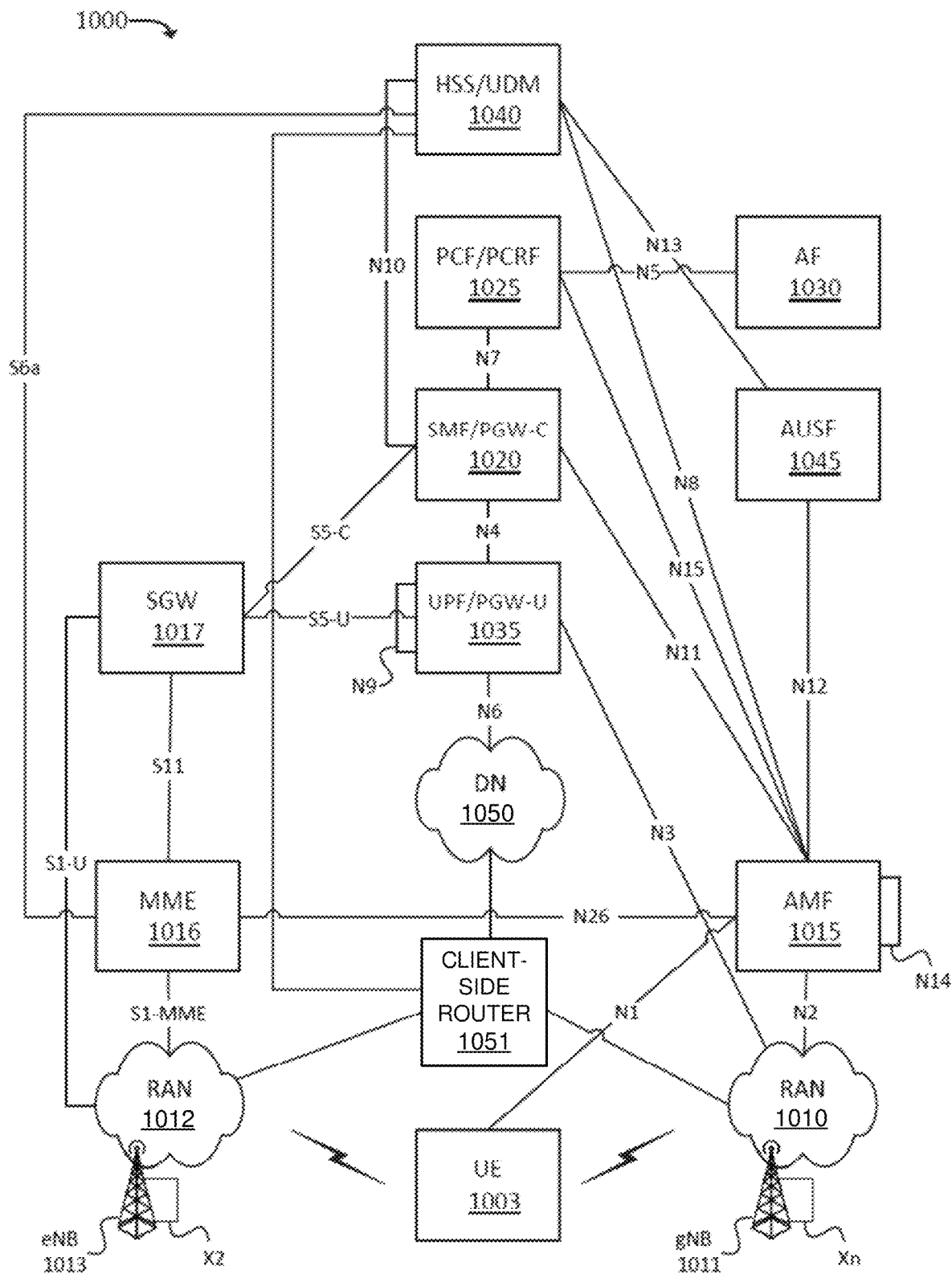
FIG. 10 is an illustration of an example environment in which at least a portion of the techniques presented herein may be utilized and/or implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 1003, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as client-side router 1051.

The example shown in FIG. 10 illustrates one instance of each network component or function (e.g., one instance of SMF/PGW-C 1020, PCF/PCRF 1025, UPF/PGW-U 1035, HSS/UDM 1040, and/or 1045). In practice, environment 1000 may include multiple instances of such components or functions. For example, in some embodiments, environment 1000 may include multiple "slices" of a core network, where each slice includes a discrete set of network functions (e.g., one slice may include a first instance of SMF/PGW-C 1020, PCF/PCRF 1025, UPF/PGW-U 1035, HSS/UDM 1040, and/or 1045, while another slice may include a second instance of SMF/PGW-C 1020, PCF/PCRF 1025, UPF/PGW-U 1035, HSS/UDM 1040, and/or 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively and/or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 1003 may include a computation and communication device, such as a wireless mobile communication device that is capable of communicating with RAN 1010, RAN 1012, and/or DN 1050. UE 1003 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1003 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 1003 may communicate with one or more other elements of environment 1000. UE 1003 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, AMF 1015, and/or one or more other devices or networks) and may communicate the traffic to UE 1003 via the air interface.

RAN 1012 may be, or may include, a LTE RAN that includes one or more base stations (e.g., one or more eNBs 1013), via which UE 1003 may communicate with one or more other elements of environment 1000. UE 1003 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 1003 via the air interface, and may communicate the traffic to UPF/PGW-U 1035, and/or one or more other devices or networks. Similarly, RAN 1010 may receive traffic intended for UE 1003 (e.g., from UPF/PGW-U 1035, SGW 1017, and/or one or more other devices or networks) and may communicate the traffic to UE 1003 via the air interface.

AMF 1015 may include one or more devices, systems, Virtualized Network Functions ("VNFs"), etc., that perform operations to register UE 1003 with the 5G network, to establish bearer channels associated with a session with UE 1003, to hand off UE 1003 from the 5G network to another network, to hand off UE 1003 from the other network to the 5G network, manage mobility of UE 1003 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 1003 with the EPC, to establish bearer channels associated with a session with UE 1003, to hand off UE 1003 from the EPC to another network, to hand off UE 1003 from another network to the EPC, manage mobility of UE 1003 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 1003. In some embodiments, the establishment of communications sessions may be performed in accordance with one or more policies provided by PCF/PCRF PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 1003, from DN 1050, and may forward the user plane data toward UE 1003 (e.g., via RAN 1010, SMF/PGW-C 1020, and/or one or more other devices). In some embodiments, multiple UPFs 1035 may be deployed (e.g., in different geographical locations), and the delivery of content to UE 1003 may be coordinated via the N9 interface (e.g., as denoted in FIG. 10 by the line marked "N9" originating and terminating at UPF/PGW-U 1035). Similarly, UPF/PGW-U 1035 may receive traffic from UE 1003 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 1003.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 1003 may communicate, through DN 1050, with data servers, other UEs UE 1003, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 1003 may communicate.

The client-side router 1051 may include one or more devices, systems, VNFs, etc., that perform one or more operations described herein. For example, the client-side router 1051 may monitor and/or analyze video stream chunks and/or statuses associated with video stream chunks to check for quality issues and/or may deliver video stream chunks to UE 1003.

Figure 11:
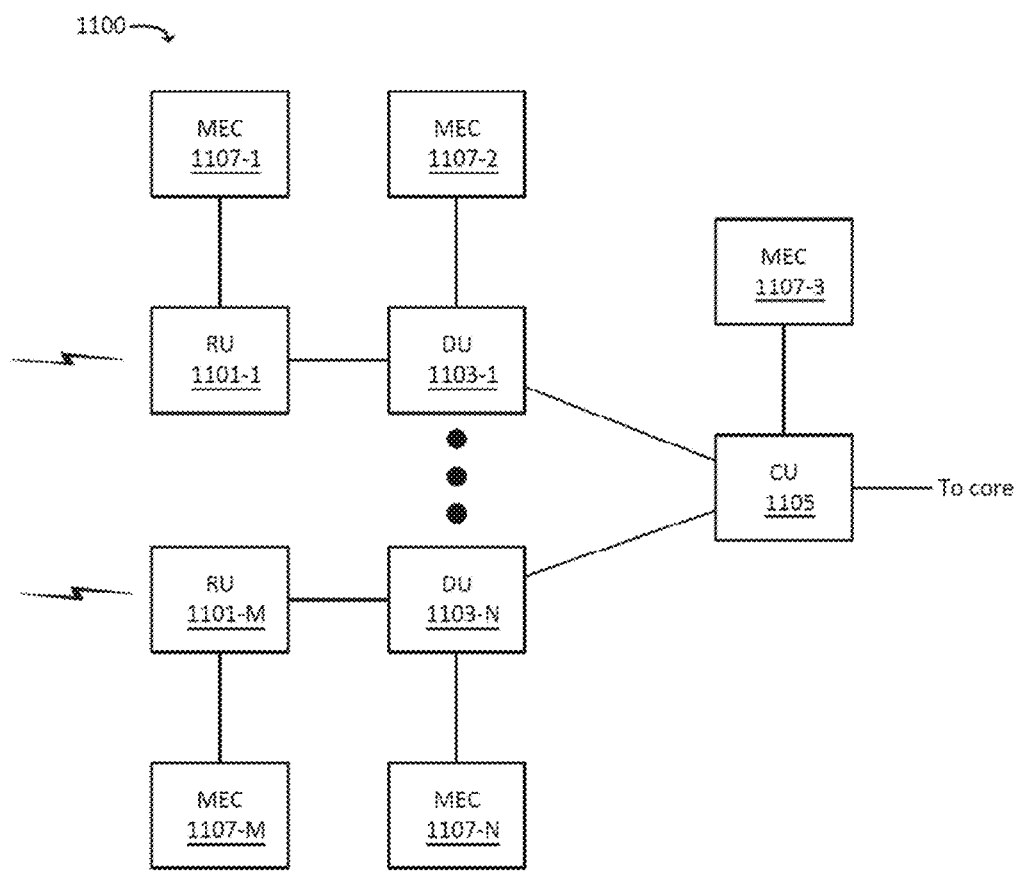
FIG. 11 is an illustration of an example network that may utilize and/or implement at least a portion of the techniques presented herein.

FIG. 11 illustrates an example Distributed Unit ("DU") network 1100, which may be included in and/or implemented by one or more RANs (e.g., RAN 1010, RAN 1012, or some other RAN). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Radio Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs UE 1003 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 1003, and may determine which DU(s) 1103 should receive the downlink traffic. DU 1103 may include one or more devices that transmit traffic between a core network (e.g., via CU 1105) and UE 1003 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 1003.

RU 1101 may include hardware circuitry (e.g., one or more RF transceivers, antennas, radios, and/or other suitable hardware) to communicate wirelessly (e.g., via an RF interface) with one or more UEs UE 1003, one or more other DUs 1103 (e.g., via RUs 1101 associated with DUs 1103), and/or any other suitable type of device. In the uplink direction, RU 1101 may receive traffic from UE 1003 and/or another DU 1103 via the RF interface and may provide the traffic to DU 1103. In the downlink direction, RU 1101 may receive traffic from DU 1103, and may provide the traffic to UE 1003 and/or another DU 1103.

RUs 1101 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 1003, via a respective RU 1101.

For example, RU 1101-1 may route some traffic, from UE 1003, to MEC 1107-1 instead of to a core network (e.g., via DU 1103 and CU 1105). MEC 1107-1 may process the traffic, perform one or more computations based on the received traffic, and may provide traffic to UE 1003 via RU 1101-1. In this manner, ultra-low latency services may be provided to UE 1003, as traffic does not need to traverse DU 1103, CU 1105, and an intervening backhaul network between DU network 1100 and the core network. In some embodiments, MEC 1107 may include, and/or may implement some or all of the functionality described above with respect to the client-side router 1051 and/or at least one cache node of the cache.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    generating a population density metric for a region;
    generating a point of interest (POI) density metric for the region, wherein generating the POI density metric for the region comprises generating a geographic feature density metric for the region based on a first count of POI sites in the region and a second count of POI sites within a predetermined distance of the region;
    generating a morphology classification for the region based on the population density metric, the geographic feature density metric and the POI density metric; and
    controlling at least one of bandwidth allocation, power or speed of a communication site based on the morphology classification.

2. The method of claim 1, wherein:
    the region is subdivided into geographic feature blocks; and
    generating the geographic feature density metric for the region comprises generating the geographic feature density metric based on a first count of geographic feature blocks in the region and a second count of geographic feature blocks within a predetermined distance of the region.

3. The method of claim 2, wherein:
    the geographic feature blocks are bounded by at least one of one or more logical boundaries or one or more physical boundaries.

4. The method of claim 2, wherein:
    the region comprises a census tract; and
    the geographic feature blocks comprise census blocks within the census tract.

5. The method of claim 1, wherein generating the population density metric comprises:
    generating the population density metric based on a population of the region and a population within a predetermined distance of the region.

6. The method of claim 1, wherein:
    the population density metric comprises a first graded density classification;
    the geographic feature density metric comprises a second graded density classification; and
    generating the morphology classification for the region comprises:
        combining the first graded density classification and the second graded density classification to generate the morphology classification.

7. The method of claim 1, wherein the morphology classification comprises at least one of ultra dense, dense urban, urban, urban-suburban, suburban, suburban-rural, or rural.

8. The method of claim 1, wherein:
    controlling at least one of bandwidth allocation, power or speed of the communication site based on the morphology classification comprises:
        assigning a utilization threshold to the communication site;
        determining a utilization metric for the communication site; and
        controlling data flow for users of the communication site based on the utilization threshold and the utilization metric.

9. A system comprising:
    a processor configured to execute instructions to facilitate performance of operations comprising:
        generating a population density metric for a region, wherein the region is subdivided into geographic feature blocks;
        generating a geographic feature density metric for the region based on a first count of geographic feature blocks in the region and a second count of geographic feature blocks within a predetermined distance of the region;
        generating a morphology classification for the region based on the population density metric and the geographic feature density metric; and
        controlling at least one of bandwidth allocation, power or speed of a communication site based on the morphology classification.

10. The system of claim 9, wherein:
    the geographic feature blocks are bounded by at least one of roads, streams, railroad tracks, property lines, or political boundaries.

11. The system of claim 10, wherein:
    the region comprises a census tract; and the geographic feature blocks comprise census blocks within the census tract.

12. The system of claim 9, the operations comprising:
generating a point of interest (POI) density metric for the region based on a count of POI sites within a second predetermined distance of the region, wherein generating the morphology classification for the region comprises generating the morphology classification for the region based on the population density metric, the geographic feature density metric, and the POI density metric.

13. The system of claim 9, wherein the morphology classification comprises at least one of ultra dense, dense urban, urban, urban-suburban, suburban, suburban-rural, or rural.

14. The system of claim 9, wherein:
controlling at least one of bandwidth allocation, power or speed of the communication site based on the morphology classification comprises:
assigning a utilization threshold to the communication site;
determining a utilization metric for the communication site; and
controlling data flow for users of the communication site based on the utilization threshold and the utilization metric.

15. A non-transitory computer-readable medium storing instructions that when executed facilitate performance of operations comprising:
generating a population density metric for a region;
generating a geographic feature density metric for the region;
generating a morphology classification for the region based on the population density metric and the geographic feature density metric; and
controlling at least one of bandwidth allocation, power or speed of a communication site based on the morphology classification, wherein controlling the communication site comprises:
assigning a utilization threshold to the communication site;
determining a utilization metric for the communication site; and
controlling data flow for users of the communication site based on the utilization threshold and the utilization metric.

16. The non-transitory computer-readable medium of claim 15, wherein:
the operations comprise generating a point of interest (POI) density metric for the region; and
generating the morphology classification for the region comprises:
generating a first graded density classification based on the population density metric;
generating a second graded density classification based on the geographic feature density metric;
generating a third graded density classification based on the POI density metric; and
combining the first graded density classification, the second graded density classification, and the third graded density classification to generate the morphology classification.

17. The non-transitory computer-readable medium of claim 15, wherein:
the region is subdivided into geographic feature blocks; and
generating the geographic feature density metric for the region comprises generating the geographic feature density metric based on a first count of geographic feature blocks in the region and a second count of geographic feature blocks within a predetermined distance of the region.

18. The non-transitory computer-readable medium of claim 17, wherein:
the geographic feature blocks are bounded by at least one of one or more logical boundaries or one or more physical boundaries.

19. The non-transitory computer-readable medium of claim 17, wherein:
the region comprises a census tract; and
the geographic feature blocks comprise census blocks within the census tract.

20. The non-transitory computer-readable medium of claim 15, wherein generating the population density metric comprises:
generating the population density metric based on a population of the region and a population within a predetermined distance of the region.

* * * * *